United States Patent [19]

Feldmann et al.

[11] 4,239,807

[45] Dec. 16, 1980

[54] POLYAMIDE COATED BASE MATERIAL HAVING AN INTERMEDIATE LAYER OF POLYBUTADIENE

[75] Inventors: Rainer Feldmann, Marl; Klaus Gorke, Haltern-Lavesum, both of Fed. Rep. of Germany

[73] Assignee: Chemische Werke Hüls AG, Marl, Fed. Rep. of Germany

[21] Appl. No.: 45,581

[22] Filed: Jun. 4, 1979

[30] Foreign Application Priority Data

Jun. 12, 1978 [DE] Fed. Rep. of Germany ....... 2825707

[51] Int. Cl.$^3$ ............................................... B05D 3/02
[52] U.S. Cl. .................................... 428/462; 427/195; 427/202; 427/407.1; 428/475.8; 428/476.3; 428/521
[58] Field of Search ................... 427/195, 202, 407 R; 428/476.3, 458, 521, 462, 475.8

[56] References Cited

U.S. PATENT DOCUMENTS

| 3,496,002 | 2/1970 | Wolfes et al. | 427/195 |
| 4,122,211 | 10/1978 | Kikaga et al. | 427/202 X |

FOREIGN PATENT DOCUMENTS

| 47-4951 | 10/1972 | Japan | 427/202 |
| 950502 | 2/1964 | United Kingdom | 427/202 |

*Primary Examiner*—Shrive P. Beck
*Attorney, Agent, or Firm*—Gilbert L. Wells

[57] ABSTRACT

An aqueous polybutadiene dispersion is applied as the adhesive intermediary layer in the preparation of polyamide coatings on metal objects by a process of sintering the polyamide powders.

The dispersion contains a liquid polybutadiene with a dynamic viscosity from about 70 to 30,000 millipascal seconds and with a configuration of 40 to 95% of cis-1,4-polybutadiene, 0 to 30% of trans-1,4-polybutadiene, 1 to 60% of 1,2-polybutadiene and, referred to the polybutadiene, 0.5 to 10% by weight of an emulsifier.

11 Claims, No Drawings

POLYAMIDE COATED BASE MATERIAL HAVING AN INTERMEDIATE LAYER OF POLYBUTADIENE

CROSS REFERENCES TO RELATED APPLICATIONS

Applicants claim priority under 35 USC 119 for application P 28 25 707.0, filed June 12, 1978 in the Patent Office of the Federal Republic of Germany.

BACKGROUND OF THE INVENTION

The field of the invention is coating processes and coated articles from polyamides using fluidized bed, flame spraying and electrostatic coating. The invention is particularly concerned with an improvement in polyamide coatings using an intermediate layer of polybutadiene from an aqueous dispersion.

The state of the art of coating a metal substrate with plasticized polylaurolactam and polyesters by fluidized bed, flame spraying and electrostatic coating methods may be ascertained by reference to Assignee's U.S. Pat. Nos. 3,900,607 and 4,011,188, the disclosures of which are incorporated herein.

The preparation of polyamide powders is known from Kirk-Othmer, Encyclopedia of Chemical Technology, 2nd Edition, Vol. 16 (1968) pp. 88–105, particularly pp. 101 and 102 and U.S. Pat. No. 4,143,025. The powders are obtained by precipitating the polyamide from solutions or by grinding the polyamide granulate, preferably at low temperatures and under an inert atmosphere.

The state of the art of polybutadiene may be ascertained by reference to Kirk-Othmer, 2nd Edition, Vol. 7 (1965), pp. 73–75 and Kirk-Othmer, 3rd Edition, Vol. 4 (1978), pp. 313–337, the disclosures of which are incorporated herein.

In order to achieve high resistance to corrosion and to chemicals, polyamide coatings applied by sintering processes require that they firmly adhere to the base. The term sintering processes includes fluidized bed, flame spraying and electrostatic coating.

Many different substances have been used as adhesive intermediate layers or base coats for polyamide coating and the state of the art of these intermediate layers may be ascertained by reference to U.S. Pat. Nos. 3,203,822 and 3,264,131 the disclosures of which are incorporated herein; British Pat. No. 950,502; W. German Pat. No. 20 03 702 and published Japanese application No. Sho-47 (1972) 4951.

U.S. Pat. No. 3,264,131 discloses the use of heat-setting phenolic resins, possibly together with thermoplastic resins as intermediate layers. U.S. Pat. No. 3,203,822 and British Pat. No. 950,502 disclose the use of styrene-butadiene copolymers. German Pat. No. 20 03 702 uses a mixture of an epoxy-modified alkyd resin and unsaturated polyester resin. Published Japanese application No. Sho-47 (1972) 4951 discloses heat-setting butadiene polymers with an average molecular weight of from 1,000 to 5,000, in particular, low-molecular, atactic 1,2-polybutadienes with a content of about 90% of 1,2-compounds.

According to the state of the art of intermediate layers, these substances are used in the form of solutions in organic solvents such as white spirits, xylene, chlorohydrocarbons, ketones or esters. Expensive protective equipment is required both for people and for the environment, especially too as regards possible powder explosions, when working with these combustible solvents.

SUMMARY OF THE INVENTION

Having in mind the limitations of the prior art, it is an object of the present invention to apply intermediate layers on a base material from an aqueous system prior to coating with polyamide powder. Objects of the intermediate layers are improved adhesion and prevention of corrosion of the base material.

The objects of the present invention are achieved by using an aqueous dispersion containing as the adhesion improving substance a liquid polybutadiene having a dynamic viscosity of from about 70 to 30,000 mPas and having a configuration with 40 to 95% of cis-1,4 from 0 to 30% of trans-1,4 and from 1 to 60% of 1,2 units referred to the polybutadiene used and from 0.5 to 10% by weight of an emulsifier.

Preferably, the liquid polybutadiene used has a dynamic viscosity between 500 and 5,000 mPas. The preferred configuration corresponds to 60 to 90% of 1,4-cis-polybutadiene, 5 to 30% of 1,4-trans-polybutadiene and 1 to 40% of 1,2-polybutadiene. Such polymers are obtained by polymerization in solution of butadiene in the presence of Ziegler catalysts as disclosed in Kirk-Othmer, 2nd Ed., Vol. 7 (1965) p. 75 and Belgian Pat. No. 549,554, referred to therein.

Dynamic viscosity is measured in millipascal seconds (mPas).

The intermediate layer after heating at about 300°–450° C. has a thickness of about 5 to 20 microns.

The polyamide layer has a thickness of about 200 to 1,000 microns.

DESCRIPTION OF THE PREFERRED EMBODIMENTS

The liquid polybutadienes are present in a concentration from about 1 to 70, preferably between 10 and 60, especially from 20 to 50% by weight in the dispersion. Suitable dispersing agents or emulsifiers basically are cationic emulsifiers as well as quaternary ammonium salts, anionic emulsifiers such as alkylbenzol sulfonates, alkyl sulfonates, alkyl sulfates or soaps of non-ionic emulsifiers such as polyglycol ether or sugar esters as disclosed in Kirk-Othmer, 2nd Ed., Vol. 8 (1966) pp. 128–130. Nonionic emulsifiers are preferred because of their better water-resistance. Especially well suited nonionic emulsifiers are the alkylarylpolyglycol ethers having 6 to 10 ethylene oxide units, for instance the corresponding octyl- and nonylphenoloxyethylates in particular. The emulsifier should be used at least in amounts of 0.5% by weight referred to the polybutadiene. When the concentrations are less, the dispersions do not remain sufficiently stable and the upper concentration limit should not exceed 10% by weight, as otherwise the adhesion of the polyamide coating is degraded. Preferably, the emulsifier is used in a concentration between about 3 and 7% by weight. The adhesion-effective dispersion can be processed by spraying, dipping or painting. The adhesion-effective intermediary layer is heated up to about 300°–450° C. prior to depositing the polyamide powder for a time until curing occurs to give a chocolate brown color. According to the heating temperature used the time is adjusted, generally the time is only a few minutes.

Surprisingly, despite using the aqueous dispersion, especially as regards the emulsifier contained ipso facto therein, no increase in corrosion of the base material of the coating is observed. Again, no decrease in adhesion of the polyamide coating, especially in the presence of aqueous, hot detergent baths, is observed.

The useful base material include iron-containing metals, aluminum, steel, zinc, copper, magnesium, alloys and metals which can be heated up to 450° C.

EXAMPLE 1

A sandblasted iron sheet metal 1 mm thick degreased with trichloroethylene is sprayed with a 50% aqueous dispersion of a polybutadiene having a dynamic viscosity of 780 mPas, 72% of 1,4-cis, 27% of 1,4-trans, 1% of 1,2 units having the designation polyöl hüls (manufactured by Bunawerke Hüls GmbH) and with a content of 5% by weight, referred to the polybutadiene, of an octylphenoloxethylate with 8 ethylene oxide units. This is followed by baking for 5 minutes at 400° C. and coating in a fluidized bed with (a) polyamide 12 and (b) with polyamide 11.

An adhesion test is carried out on a cross grating section. A depression of 6 mm is made in this section using the so-called Erichsen depression instrument. Then adhesive tape is used in attempting to pull off the coating. The adhesion was 100% both in case (a) and case (b). Again, after storing the sample in hot water at 90° C. or in a 90° C. 3% solution of a commercial coarse detergent, neither decreased adhesion nor subsurface erosion could be observed after 1,500 hours at the cut.

EXAMPLE 2

Use was made in similar manner of a 20% aqueous dispersion with a content of 7% of a nonylphenoloxethylate with 8 moles of ethylene oxide. Adhesion was equally good.

COMPARISON EXAMPLE

The procedure was the same as in Example 1, except that in lieu of the 50% aqueous polybutadiene dispersion described therein, a polybutadiene solution as described in the Japanese patent application No. Sho-47 (1972) 4951 with a content of about 90% of 1,2-compounds as 30% solution in white spirit was used. Applying the adhesion test described in Example 1, a sub-surface erosion was noticed in the cut after 1,000 hrs.

We claim:

1. A method of coating a base material with a polyamide coating comprising:
    applying to said base material an aqueous dispersion containing in a concentration of about 1 to 70% by weight a liquid polybutadiene having a dynamic viscosity from about 70 to 30,000 millipascal seconds and having a configuration of 40 to 95% of cis-1,4-polybutadiene, 0 to 30% of trans-1,4-polybutadiene, 1 to 60% of 1,2-polybutadiene and, referred to the total polybutadiene, 0.5 to 10% by weight of an emulsifier;
    drying said liquid polybutadiene to form an intermediate layer; and
    applying polyamide powder to said intermediate layer with sintering to form a polyamide coated base material.
2. The method of claim 1, wherein said base material is a metal which can be heated to 450° C.
3. The method of claim 2, wherein said base material is selected from the group consisting of iron containing metals, aluminum, zinc, copper and magnesium.
4. The method of claim 1, wherein said liquid polybutadiene has a dynamic viscosity from about 500 to 5000 millipascal seconds and has a configuration of 60 to 90% of cis-1,4-polybutadiene, 5 to 30% of trans-1,4-polybutadiene and 1 to 40% of 1,2-polybutadiene.
5. The method of claim 4, wherein said step of drying is carried out by heating to a temperature up to about 300°–450° C.
6. The method of claim 5, wherein said liquid polybutadienes are present in said aqueous dispersion in a concentration of about 10 to 60% by weight.
7. The method of claim 6, wherein said liquid polybutadienes are present in said aqueous dispersion in a concentration of about 20 to 50% by weight.
8. The method of claim 1, wherein said emulsifier is present in a concentration of about 3 to 7% by weight referred to the total polybutadiene.
9. The method of claim 8, wherein said emulsifier is selected from the group consisting of quaternary ammonium salts, alkylbenzol sulfonates, alkyl sulfates, soaps of polyglycol ether, soaps of sugar esters and alkylarylpolyglycol ethers having 6 to 10 ethylene oxide units.
10. A coated article having:
    (a) a metal base which can be heated to 450° C.;
    (b) an intermediate layer on said metal base comprising a polybutadiene having a dynamic viscosity from about 70 to 30,000 millipascal seconds and having a configuration of 40 to 95% of cis-1,4-polybutadiene, 0 to 30% of trans-1,4-polybutadiene and 1 to 60% of 1,2-polybutadiene; and
    (c) a polyamide layer coated on said intermediate layer.
11. The coated article of claim 10, wherein:
    (a) said metal base is selected from the group consisting of iron containing metals, aluminum, zinc, copper and magnesium;
    (b) said intermediate layer has a thickness of about 5 to 20 microns and said polybutadiene has a dynamic viscosity from about 500 to 5,000 millipascal seconds and has a configuration of 60 to 90% of cis-1,4-polybutadiene, 5 to 30% of trans-1,4-polybutadiene and 1 to 40% of 1,2-polybutadiene; and
    (c) said polyamide layer has a thickness of about 200 to 1,000 microns.

* * * * *